US008639417B2

(12) United States Patent
Illg et al.

(10) Patent No.: US 8,639,417 B2
(45) Date of Patent: Jan. 28, 2014

(54) METHOD FOR REGULATING POSITION AND/OR SPEED

(75) Inventors: Matthias Illg, Ingolstadt (DE); Berthold Hellenthal, Schwanstetten (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 13/641,792

(22) PCT Filed: Apr. 15, 2011

(86) PCT No.: PCT/EP2011/001920
§ 371 (c)(1),
(2), (4) Date: Dec. 26, 2012

(87) PCT Pub. No.: WO2011/128107
PCT Pub. Date: Oct. 20, 2011

(65) Prior Publication Data
US 2013/0103266 A1  Apr. 25, 2013

(30) Foreign Application Priority Data
Apr. 17, 2010  (DE) .......................... 10 2010 015 316

(51) Int. Cl.
*G05B 19/19* (2006.01)
*B60K 37/02* (2006.01)

(52) U.S. Cl.
USPC ............................................ 701/49; 318/599

(58) Field of Classification Search
USPC ............................................ 701/49; 318/599
See application file for complete search history.

(56) References Cited

U.S. PATENT DOCUMENTS

| 3,263,186 | A | | 7/1966 | Calcai |
| 3,900,781 | A | | 8/1975 | Smith et al. |
| 4,105,940 | A | * | 8/1978 | Kuhnlein ...................... 318/653 |
| 4,529,964 | A | * | 7/1985 | Minami et al. .................. 341/13 |
| 4,577,271 | A | * | 3/1986 | Jones et al. ..................... 700/69 |
| 4,578,763 | A | * | 3/1986 | Jones et al. ................... 700/250 |
| 4,701,839 | A | * | 10/1987 | McNally et al. ................ 700/61 |
| 4,772,831 | A | * | 9/1988 | Casler et al. ............. 318/568.15 |
| 4,794,312 | A | * | 12/1988 | Kano et al. .................... 318/599 |
| 5,428,285 | A | * | 6/1995 | Koyama et al. ............... 318/799 |
| 5,552,689 | A | * | 9/1996 | Matoba ......................... 318/599 |
| 5,598,304 | A | | 1/1997 | Choi et al. |

(Continued)

FOREIGN PATENT DOCUMENTS

| DE | 33 33 007 | 3/1984 |
| DE | 198 01 982 | 2/1999 |

(Continued)

OTHER PUBLICATIONS

Stanley M. Shinners, "Modern Control System Theory and Application, Second Edition," Addison-Wesley Publishing Company, Annex 1, 1978, 11pages.

(Continued)

*Primary Examiner* — James Trammell
*Assistant Examiner* — David Testardi
(74) *Attorney, Agent, or Firm* — Staas & Halsey LLP

(57) ABSTRACT

A method regulates the position and/or speed of a device which can be moved along a predefined course using an electric motor. The regulating operation is carried out continuously in such a manner that targeted fluctuation of the controlled variables of position and/or speed around their desired values is respectively achieved within a predefinable tolerance range by selecting a manipulated variable.

8 Claims, 1 Drawing Sheet

(56) References Cited

U.S. PATENT DOCUMENTS

| | | | |
|---|---|---|---|
| 5,799,214 A * | 8/1998 | Iwane | 396/135 |
| 6,028,370 A * | 2/2000 | Lamm et al. | 307/10.1 |
| 6,137,251 A | 10/2000 | Huang et al. | |
| 6,448,893 B1 * | 9/2002 | Dobberkau et al. | 340/461 |
| 7,026,779 B2 * | 4/2006 | Eba | 318/609 |
| 7,253,580 B2 * | 8/2007 | Stockberger et al. | 318/610 |
| 7,276,877 B2 * | 10/2007 | Qiu et al. | 318/721 |
| 7,370,983 B2 | 5/2008 | DeWind et al. | |
| 8,340,835 B2 * | 12/2012 | Takayama | 700/304 |
| 2003/0128103 A1 * | 7/2003 | Fitzpatrick et al. | 340/425.5 |

FOREIGN PATENT DOCUMENTS

| | | | | |
|---|---|---|---|---|
| DE | 101 38 540 | | 3/2002 | |
| DE | 10 2004 028 103 | | 2/2005 | |
| DE | 699 19 292 | | 9/2005 | |
| DE | 600 20 192 T2 | | 1/2006 | |
| DE | 602 23 690 | | 10/2008 | |
| JP | 60207480 A | * | 10/1985 | H02P 5/06 |
| JP | 62164106 A | * | 7/1987 | G05B 13/02 |
| JP | 01177885 A | * | 7/1989 | H02P 3/06 |

OTHER PUBLICATIONS

International Search Report for PCT/EP2011/001920, mailed on Jul. 18, 2011.
International Preliminary Report on Patentability for PCT/EP2011/001920, mailed Nov. 15, 2012, 5 pages.
Corrected International Preliminary Examination Report (including PCT/IPEA/416, PCT/IPEA/409, Transmittal Letter and Amended Sheets), (Sep. 27, 2012).
German Office Action dated Nov. 4, 2013 in German Patent Application No. 102010015316.8.

* cited by examiner

METHOD FOR REGULATING POSITION AND/OR SPEED

CROSS REFERENCE TO RELATED APPLICATIONS

This application is based on and hereby claims priority to International Application No. PCT/EP2011/001920 filed on Apr. 15, 2011 and German Application No. 10 2010 015 316.8 filed on Apr. 17, 2010, the contents of which are hereby incorporated by reference.

BACKGROUND

The invention relates to a method for regulating the position and/or speed of a device which can be moved along a predefined course using an electric motor. The invention also relates to an electronic regulating and control device of a motor vehicle for carrying out such a method.

A wide variety of methods for regulating the position and/or speed of a device which can be moved along a predefined course using an electric motor are known from the general related art. Such a device may be, for example, a display which can be countersunk in the dashboard of motor vehicles or a retractable display of a vehicle assistance system, vehicle information system or the like. In this case, the motion sequence while moving the display is of interest, in particular, since it draws the vehicle occupants' attention to it as a so-called staged movement.

It is known practice to use electric motors for such applications, which electric motors are operated using pulse width control or pulse width modulation (PWM). In this case, a curve is generally stored in a memory of a control device for the movement path of the device as the specification of the pulse width control of the electric motor. After a fixed period of time after the start of the movement, the desired position and the actual position are then compared once and a fixed correction factor for the remainder of the curve is calculated from the result of this comparison and is used. Continuous readjustment is generally not carried out. Furthermore, the storage capacity and the resources of the microcontroller are limited in such control devices.

DE 602 23 690 T2 and U.S. Pat. No. 6,137,251 describe operations for regulating electric motors using pulse width modulation (PWM).

SUMMARY

On the basis of this, one potential object is providing a method of the type mentioned at the outset which avoids the disadvantages of the related art, in particular allows a fluid movement of the device, preferably using a minimum of system resources.

The inventors propose a method for regulating the position and/or speed of a device which can be moved along a predefined course using an electric motor, in which the regulating operation is carried out continuously in such a manner that targeted fluctuation of the controlled variables of position and/or speed around their desired values is respectively achieved within a predefinable tolerance range by selecting a manipulated variable. In this case, the manipulated variable is the output variable from the regulating operation for adjusting the electric motor.

The measures according to the proposed method enable a flowing movement of the movable device by continuous readjustment to a path curve or to a speed curve. In this case, it is very advantageous that a targeted or desired fluctuation or oscillation of the controlled variables around the desired values is produced within a predefinable tolerance range. For this purpose, the controlled variables of position and/or speed are always alternately kept, as it were, in a tolerance range by a first amount above the desired value and by a second amount below the desired value, in particular by readjustment using exaggerated values. This desired instability results in stability. The method therefore becomes robust to disturbances since the latter are essentially also nothing but oscillations around the desired value. On account of the delay time with which the actual values are measured, it is likewise more advantageous to readjust in a particular tolerance range.

The electric motor can be controlled using PWM signals.

The current position and/or the current speed of movement of the device can be determined from the current rotational speed of the electric motor.

The inventors also propose for the current rotational speed of the electric motor to be detected using at least one Hall sensor.

It is very advantageous if only integer arithmetic operations, in particular addition or subtraction and a comparison operation, are used during the regulating operation. If only integer arithmetic operations with exclusively addition, subtraction and comparison are used in the regulating operation, very modest microcontroller performance in the control device is needed for the regulating method. Only a small amount of computation power is therefore required.

An array or data field containing the expected position of the device at a particular time can be used during the regulating operation. Such an array can be used to assess the position and speed. All desired positions at every defined time are contained therein. The current desired speed is obtained by subtracting the desired position at a first time from the desired position at a second time.

The regulating operation may take into account voltage, temperature and batch fluctuations as well as wear.

Two first tables for determining the degree of deviation of the controlled variables can be used during the regulating operation. The degree of deviation can be determined, with the aid of the first table or the deviation array for the location, by comparing the currently detected actual position and the associated desired position. The same applies to the speed if the deviation array for the speed is used.

It is advantageous if a second table for determining the correction values for the pulse width modulation signals is used during the regulating operation. The values which are predetermined using the first tables and relate to the degree of deviation for the position and speed are used as indices for the second table, the incremental array for determining the correction values with which the pulse width modulation signal is ultimately left unchanged, is increased or is decreased.

The device may be a retractable display apparatus arranged inside a motor vehicle, in particular an LCD display of a vehicle system of the motor vehicle.

Only a small memory depth is required on account of the array, the first tables and the second table which is used to carry out the regulating operation. Only few memory resources are therefore required in the control device.

The inventors also propose an electronic regulating and control device of a motor vehicle.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
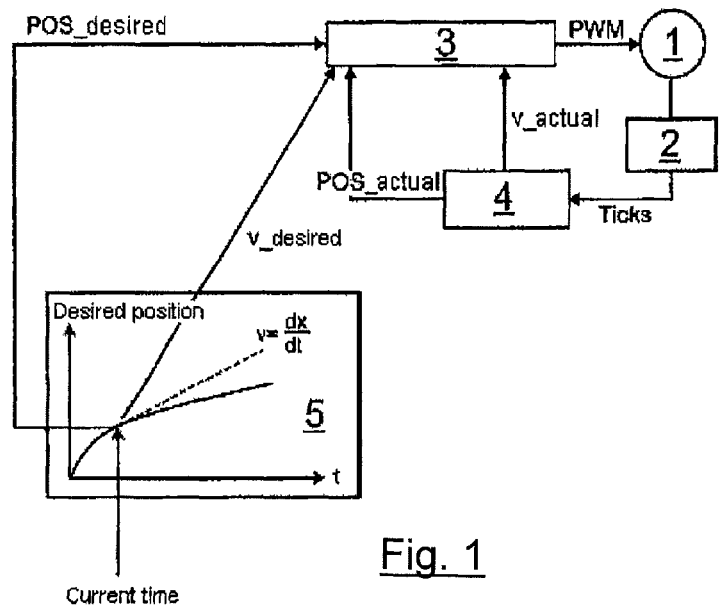
FIG. 1 shows a schematic illustration for explaining a first embodiment of a method proposed by the inventors.

Reference will now be made in detail to the preferred embodiments of the present invention, examples of which are illustrated in the accompanying drawings, wherein like reference numerals refer to like elements throughout.

A proposed method for regulating the position and/or speed of a device which can be moved along a predefined course using an electric motor 1 is explained using FIG. 1. The regulating operation is carried out continuously in such a manner that targeted fluctuation of the controlled variables of position and/or speed around their desired values POS_desired, V_desired is respectively achieved within a predefinable tolerance range by selecting a manipulated variable in the form of a pulse width modulation signal PWM. The electric motor 1 is controlled using pulse width modulation PWM. The electric motor 1 can therefore be decelerated or accelerated using a PWM signal. The rotational speed of the electric motor 1 is detected with the aid of a Hall sensor 2. The target variables are the position at a particular time and the associated speed. The location is used as the reference variable. A regulating algorithm 3 determines the current position POS_actual of the device (not illustrated) and its current speed of movement V_actual from the rotational speed of the electric motor 1. The regulating algorithm 3 cyclically controls the input signals relating to the actual position POS_actual by accumulating all previously detected ticks of the Hall sensor 2 in a position counter 4 and controls the current speed V_actual using the number of ticks of the Hall sensor 2 in the interval which has just expired.

The arrays or tables which are available for assessing the deviations from the target variables are discussed in more detail below.

A one-dimensional array or position array containing the expected desired positions POS_desired at particular times t (a maximum of 100 positions in the present exemplary embodiment) is used during the regulating operation. This array is illustrated in a simplified manner in the figures in the form of a functional diagram 5. In this case, the time t is plotted on the horizontal axis and the desired position POS_desired is plotted on the vertical axis. The speed V=dx/dt is also indicated in a dashed form. The position array is used to assess the position and speed. All desired positions POS_desired at every defined time are contained therein and the current desired speed V_desired is obtained by calculation.

Two first tables for determining the degree of deviation of the controlled variables are used during the regulating operation. The two first tables or arrays have values which indicate how severe the deviation of the respective target variable is or the extent to which the desired value deviates from the current value ("downward", "OK", "upward"). One table is provided for the position and a further table is provided for the speed. These first tables are also referred to as deviation arrays each for the location and speed. A deviation with respect to location and speed on the entire path of the device can be determined using the specifications in the first tables.

The degree of deviation can be determined, with the aid of the deviation arrays for the location, by comparing the currently detected actual position POS_actual and the associated desired position POS_desired. The same applies to the speed if the deviation array for the speed is used. These two values, the degree of deviation for speed and location, are now used as indices for a second table or an incremental array which ultimately leaves the PWM signal unchanged, increases or decreases the signal, that is to say contains the correction values for the pulse width modulation signals PWM.

This second table or array is, in the present case, a 3×3 array or a 5×5 array with the relative increase or decrease in the current PWM signal on the basis of the position and speed deviations. The second table contains nine or 25 values with "maximum/mean braking value", "OK", "maximum/mean acceleration value". Different embodiments of the second table are illustrated in a simplified manner below. However, any dimension (A×B) is possible for the table, in principle.

| | | LOCATION | | |
|---|---|---|---|---|
| | | Too short | OK | Too far |
| Speed | Too slow OK | Max. accel. | | |
| | | | PWM without change, value = 0 | |
| | Too fast | | | Max. braking value |

| | | LOCATION | | | | |
|---|---|---|---|---|---|---|
| | | Much too short | Too short | OK | Too far | Much too far |
| Speed | Much too slow | Max. accel. | | | | |
| | Too slow OK | | | | | |
| | | | | PWM without change, value = 0 | | |
| | Too fast Much too fast | | | | | Max. braking value |

In the present exemplary embodiment, the electric motor 1 is always started with a parameterizable starting value (even after a possible blockade). In this case, the starting value depends on the current battery condition of the motor vehicle as follows: 100% PWM signal at 9 volts and 70% PWM signal at 16 volts. Integer interpolation is carried out with a voltage of between 9 volts and 16 volts.

Only integer arithmetic operations, in particular addition or subtraction and a comparison operation, are used in the regulating method. Only a low storage capacity is required as a result of the tables or arrays mentioned. The device is in the form of a retractable display apparatus arranged inside a motor vehicle, in particular an LCD display of a vehicle system of the motor vehicle. The regulating method runs on an electronic regulating and control device of the motor vehicle.

Figure 2:
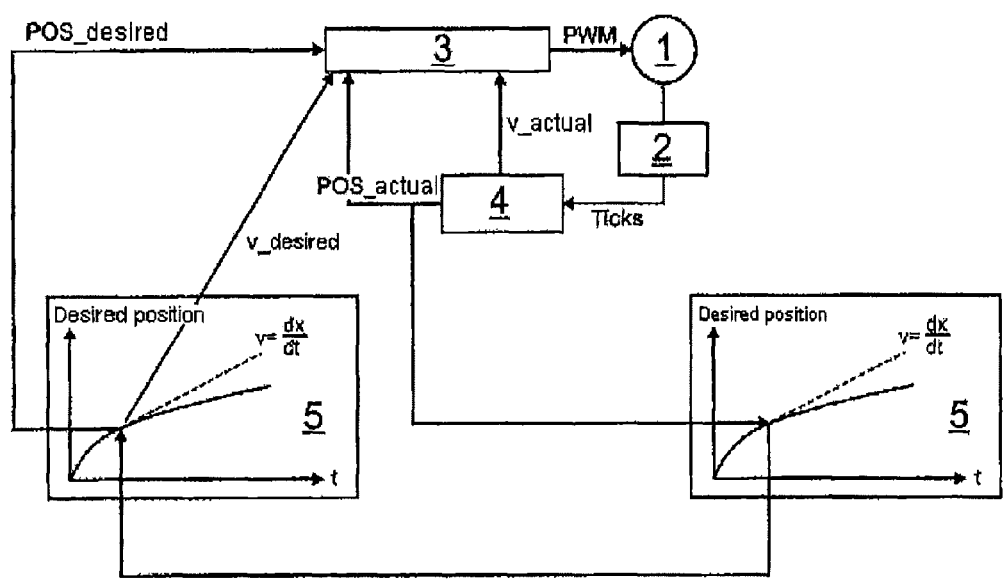
FIG. 2 shows a schematic illustration for explaining a second embodiment of the method proposed by the inventors.

FIG. 2 indicates the method in an alternative embodiment with the reference variable time. For this purpose, the procedure is as follows. The current time and the current rotational speed of the electric motor 1 are first of all measured. The position is determined therefrom. The desired time is determined in the position array 5 using the current position of the device. The actual time t is replaced with the desired time for the current actual position POS_actual. The deviation from the location is therefore equal to 0. The degree of speed deviation can be determined, with the aid of the deviation array for the speed, using the difference between the current speed V_actual and the desired speed V_desired at the determined time (desired time). This degree determines the manipulated variable on the basis of the ordinate (Y axis) of the incremental array. This concept is intended to be able to be switched on and off.

In the present exemplary embodiment, the regulating operation comprises the following boundary conditions. The base clock of the regulating algorithm 3 is 20 ms. The Hall signal is sampled every 2 ms. The minimum calculated pulse width is 8 ms. Two rotational kinematics with two different movement paths need to be supported. A parameterizable PWM starting value is specified. All arrays are available in the control device of the motor vehicle, in particular in an EEPROM. Only integer arithmetic operations are allowed.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide V. DIRECTV,* 69 USPQ2d 1865 (Fed. Cir. 2004).

The invention claimed is:

1. A method for regulating a position and speed of a retractable display apparatus which is arranged inside a motor vehicle and can be moved along a predefined course using an electric motor, the method comprising:
   performing a regulating operation to control the electric motor using pulse width modulation as a manipulated variable;
   setting position and speed as controlled variables;
   performing the regulating operation continuously in such a manner that targeted fluctuation of the controlled variables of position and speed around their desired values is respectively achieved within a predefinable tolerance range by setting the manipulated variable;
   using an array to describe a desired position of the retractable display apparatus arranged inside the motor vehicle at a particular time;
   comparing, in two first tables, the desired controlled variable values with actual controlled variable values for determining a degree of deviation of each of the controlled variables; and
   during the regulating operation, using a second table for determining correction values for the pulse width modulation as the manipulated variable.

2. A method according to claim 1, wherein a current rotational speed of the electric motor is detected using at least one Hall sensor.

3. A method according to claim 1, wherein only integer arithmetic operations are used during the regulating operation.

4. A method according to claim 1, wherein the retractable display apparatus arranged inside the motor vehicle is an LCD display of a vehicle system of the motor vehicle.

5. A method according to claim 1, wherein the controlled variables of position and speed are each always kept in a tolerance range defined by a first amount above the desired value and by a second amount below the desired value.

6. A method according to claim 1, wherein addition, subtraction, and a comparison operation are used during the regulating operation.

7. A regulating and control device of a motor vehicle configured to perform a method for regulating a position and speed of a retractable display apparatus which is arranged inside a motor vehicle and can be moved along a predefined course using an electric motor, the method comprising:
   performing a regulating operation to control the electric motor using pulse width modulation as a manipulated variable;
   setting position and speed as controlled variables;
   performing the regulating operation continuously in such a manner that targeted fluctuation of the controlled variables of position and speed around their desired values is respectively achieved within a predefinable tolerance range by setting the manipulated variable;
   using an array to describe a desired position of the retractable display apparatus arranged inside the motor vehicle at a particular time;
   comparing, in two first tables, the desired controlled variable values with actual controlled variable values for determining a degree of deviation of each of the controlled variables; and
   during the regulating operation, using a second table for determining correction values for the pulse width modulation as the manipulated variable.

8. A method for regulating a position and speed of a retractable display apparatus which is arranged inside a motor vehicle and can be moved along a predefined course using an electric motor, the method comprising:
   performing a regulating operation to control the electric motor using pulse width modulation as a manipulated variable;
   setting position and speed as controlled variables;
   performing the regulating operation continuously in such a manner that targeted fluctuation of the controlled variables of position and speed around their desired values is respectively achieved within a predefinable tolerance range by setting the manipulated variable;
   using an array to describe a desired position of the retractable display apparatus arranged inside the motor vehicle at a particular time;
   using two first tables for determining a degree of deviation of each of the controlled variables; and
   during the regulating operation, using a second table for determining correction values for the pulse width modulation as the manipulated variable,
   wherein the correction values are determined from the second table based on the degree of deviation of each of the controlled variables.

* * * * *